(12) United States Patent
Hopper

(10) Patent No.: US 9,328,881 B2
(45) Date of Patent: May 3, 2016

(54) RAPID DEPLOYMENT LIGHTING SYSTEM

(71) Applicant: Michael Blair Hopper, Westborough, MA (US)

(72) Inventor: Michael Blair Hopper, Westborough, MA (US)

( * ) Notice: Subject to any disclaimer, the term of this patent is extended or adjusted under 35 U.S.C. 154(b) by 0 days.

(21) Appl. No.: 14/032,965

(22) Filed: Sep. 20, 2013

(65) Prior Publication Data

US 2014/0293592 A1 Oct. 2, 2014

Related U.S. Application Data

(60) Provisional application No. 61/704,114, filed on Sep. 21, 2012.

(51) Int. Cl.
| | |
|---|---|
| *F21L 4/02* | (2006.01) |
| *F21L 14/00* | (2006.01) |
| *F21S 2/00* | (2016.01) |
| *F21S 4/00* | (2016.01) |
| *F21V 23/02* | (2006.01) |
| *F21V 17/00* | (2006.01) |
| *H05B 33/08* | (2006.01) |
| *H05B 37/02* | (2006.01) |
| *F21L 4/00* | (2006.01) |
| *F21S 9/02* | (2006.01) |
| *F21V 23/00* | (2015.01) |
| *F21V 23/04* | (2006.01) |
| *F21Y 101/02* | (2006.01) |
| *F21Y 113/00* | (2016.01) |
| *F21S 9/03* | (2006.01) |

(52) U.S. Cl.
CPC . *F21L 14/00* (2013.01); *F21S 2/00* (2013.01); *F21S 4/001* (2013.01); *F21V 17/007* (2013.01); *F21V 23/008* (2013.01); *F21V 23/023* (2013.01); *H05B 33/0803* (2013.01); *H05B 37/0245* (2013.01); *F21S 9/02* (2013.01); *F21S 9/032* (2013.01); *F21V 23/001* (2013.01); *F21V 23/0435* (2013.01); *F21Y 2101/02* (2013.01); *F21Y 2113/005* (2013.01)

(58) Field of Classification Search
CPC ............. F21L 14/00; F21S 2/00; F21S 4/001; F21V 23/008; F21V 23/023; F21V 17/007; H05B 33/0803; H05B 37/0245
USPC ................ 362/183–185, 187–195, 227–231, 362/233–249.15, 253, 257–258, 384, 640, 362/647–659
See application file for complete search history.

(56) References Cited

U.S. PATENT DOCUMENTS

| | | | | |
|---|---|---|---|---|
| 5,477,129 | A * | 12/1995 | Myslinski | ............. G06F 1/1616 320/DIG. 21 |
| 7,080,985 | B2 * | 7/2006 | Hopper | ................ H01R 13/625 174/86 |

(Continued)

*Primary Examiner* — Anh Mai
*Assistant Examiner* — Nathaniel Lee
(74) *Attorney, Agent, or Firm* — Davis, Malm & D'Agostine, P.C.

(57) ABSTRACT

A rapidly deployable portable lighting system includes a low voltage rechargeable power source, lights, and a wiring harness configured for being coupled to the lights with quick-release connectors. Each light includes a housing, LEDs receiving power from the power source and transmitting light of at least two colors, and a power port for connecting to the wiring harness. A controller is configured to selectively switch individual LEDs on and off, independently of one another, to control illumination. A smart case houses the power source and controller integrally therein, and is sized and shaped to receive the lights and wiring harness for storage and transport. The lights and wiring harness may be removed from the case for deployment.

25 Claims, 12 Drawing Sheets

(56) References Cited

U.S. PATENT DOCUMENTS

2010/0148672 A1* 6/2010 Hopper .............. F21V 23/0435
    315/113
2012/0201016 A1* 8/2012 Robertson ................. F21L 4/08
    362/183
2012/0212942 A1* 8/2012 Chen ..................... F21L 14/023
    362/183

* cited by examiner

RAPID DEPLOYMENT LIGHTING SYSTEM

RELATED APPLICATION

This application claims the benefit of U.S. Provisional Patent Application Ser. No. 61/704,114, entitled RDLS Rapid Deployment Lighting System, filed on Sep. 21, 2012, the contents of which are incorporated herein by reference in their entirety for all purposes.

TECHNICAL FIELD

This invention relates to lighting systems, and more particularly to a portable, self-contained, and energy efficient system configured for being rapid deployment.

BACKGROUND INFORMATION

Throughout this application, various publications, patents and published patent applications are referred to by an identifying citation. The disclosures of the publications, patents and published patent applications referenced in this application are hereby incorporated by reference into the present disclosure.

There is a need to have a lighting system for military tent deployments that can be setup quickly without the need for generators and their associated shock hazards. Current military tent lighting systems require generators for operational power. Generator setup is time consuming and often serves to undesirably delay tent deployments. Generators also have many requirements, including fuel, maintenance, trained personnel for operation and maintenance, and a cumbersome logistical supply chain including various personnel to move them to their intended deployment destinations. Currently, when a generator runs out of fuel or has a mechanical malfunction, all the lights connected to it go out. Generators also create diesel fumes and noise that may give away positions and potentially put missions at risk. Generators used in combat locations also present 'secondary explosion' risk which often require placement underground.

Current lighting systems use conventional line voltage of 110-230 VAC that can cause accidental electrocutions and require relatively heavy wiring to help insulate against such hazard. In addition, the conventional light bulbs used in these systems tend to be relatively energy inefficient, fragile, and burn out relatively frequently. These systems therefore require a good supply of replacement bulbs that require careful handling and packaging during transport. It is also noted that when a mission changes status, e.g., to a 'red alert' status, white bulbs in current lighting systems need to be quickly unscrewed and replaced with red bulbs, which is relatively labor intensive and often results in burned fingers. Providing a supply of both red and white bulbs adds to the bulk of bulbs that must be inventoried, transported, and maintained. It is also noted that the average conventional light kit for a U.S. Army "GP medium tent" (16 ft.×32 ft.) weighs about 320 pounds, is bulky, and uses threaded connectors that may be easily cross threaded and rendered inoperable, particularly when setup is completed in the dark.

A need exists for an improved lighting system that addresses one or more of the above-described drawbacks.

SUMMARY

According to one aspect of the invention, a rapidly deployable portable lighting system includes a low voltage rechargeable power source, and a plurality of lights, each including a housing, a plurality of LEDs disposed in spaced relation within the housing and configured to receive operational power from the low voltage rechargeable power source, the LEDs configured to selectively transmit light of at least two mutually distinct colors within a field of illumination, and a power port including a first quick-release connector portion. The system also includes a wiring harness having a first end portion configured for being communicably coupled to the power source, and a second end portion having a plurality of second quick-release connector portions disposed in spaced relation thereon. The second quick-release connector portions are configured for quick-release engagement with the first quick-release connector portions to supply power from the power source to the lights. A controller is configured to selectively switch individual LEDs on and off, independently of one another, to control illumination within the field of illumination. A smart case includes the power source and controller integrally disposed therein, and is sized and shaped to receive the lights and wiring harness therein for storage and transport. The lights and wiring harness may be removed from the case for deployment, wherein the first end portion is communicably coupled to the power source and the second end portion is extended to the lights disposed in spaced relation within a tent or other area to be illuminated.

In another aspect of the invention, a method of deploying a portable light system includes transporting the aforementioned portable lighting system to a desired deployment location, removing the wiring harness from the case, and communicably coupling a first end portion of the wiring harness to the rechargeable power source. The lights are also removed from the case and coupled to the wiring harness using the quick release connector portions. The lights are disposed in spaced relation within an area to be illuminated. The controller is used to selectively switch individual LEDs on and off, independently of one another, to control illumination within the field of illumination. The rechargeable power source is recharged using a solar panel, a motor vehicle alternator, or other sources coupled to the case.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. The term such as "app" or "application", refers to a computer-related component, including hardware, software, and/or software in execution. For example, an app may be, but is not limited to being, a process running on a processor, a processor including an object, an executable, a thread of execution, a program, and a computer. Moreover, the various components may be localized on one computer and/or distributed between two or more computers.

Figure 1:
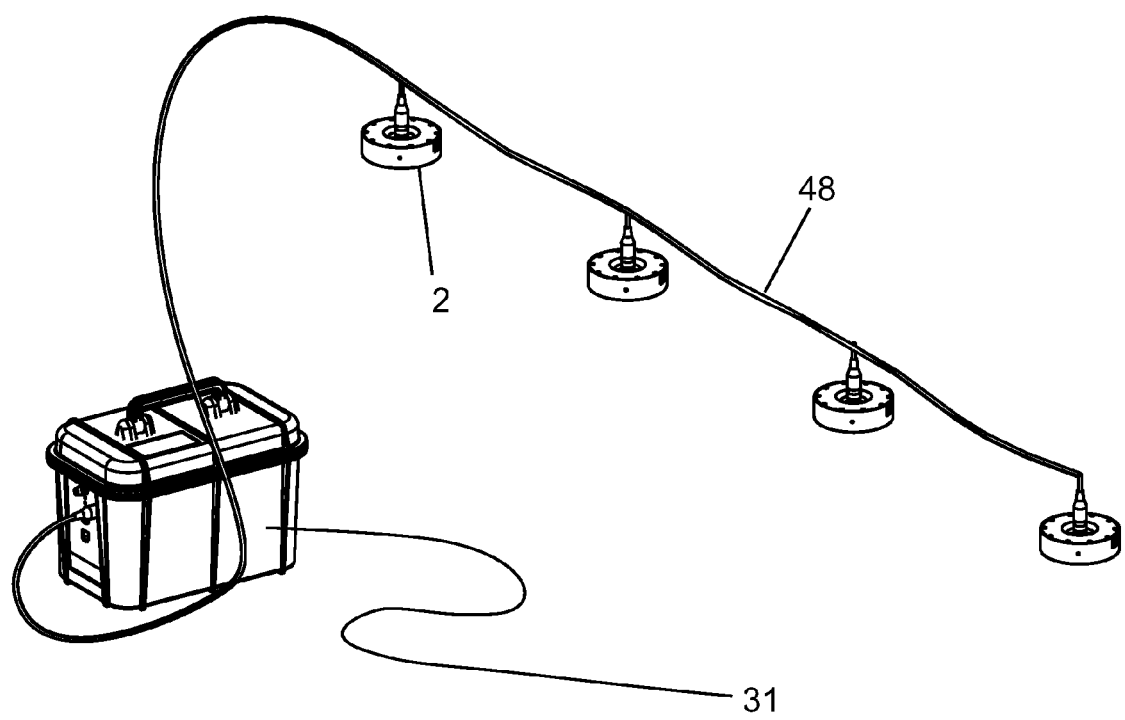
FIG. 1 is a perspective view of an embodiment of the present invention.

Referring now to the Figures, representative embodiments of the present invention will be described. As shown in FIG. 1, in one embodiment of the present invention, a portable, rapidly deployable lighting system 1 includes a smart case (lighting control box) 31 with an integral controller 3 and low voltage rechargeable power source (e.g., battery, capacitor, fuel cell, etc.) 54 (FIG. 8), a plurality of lights 2, and a wiring harness 48 connecting the lights to the case 31.

Figure 2:
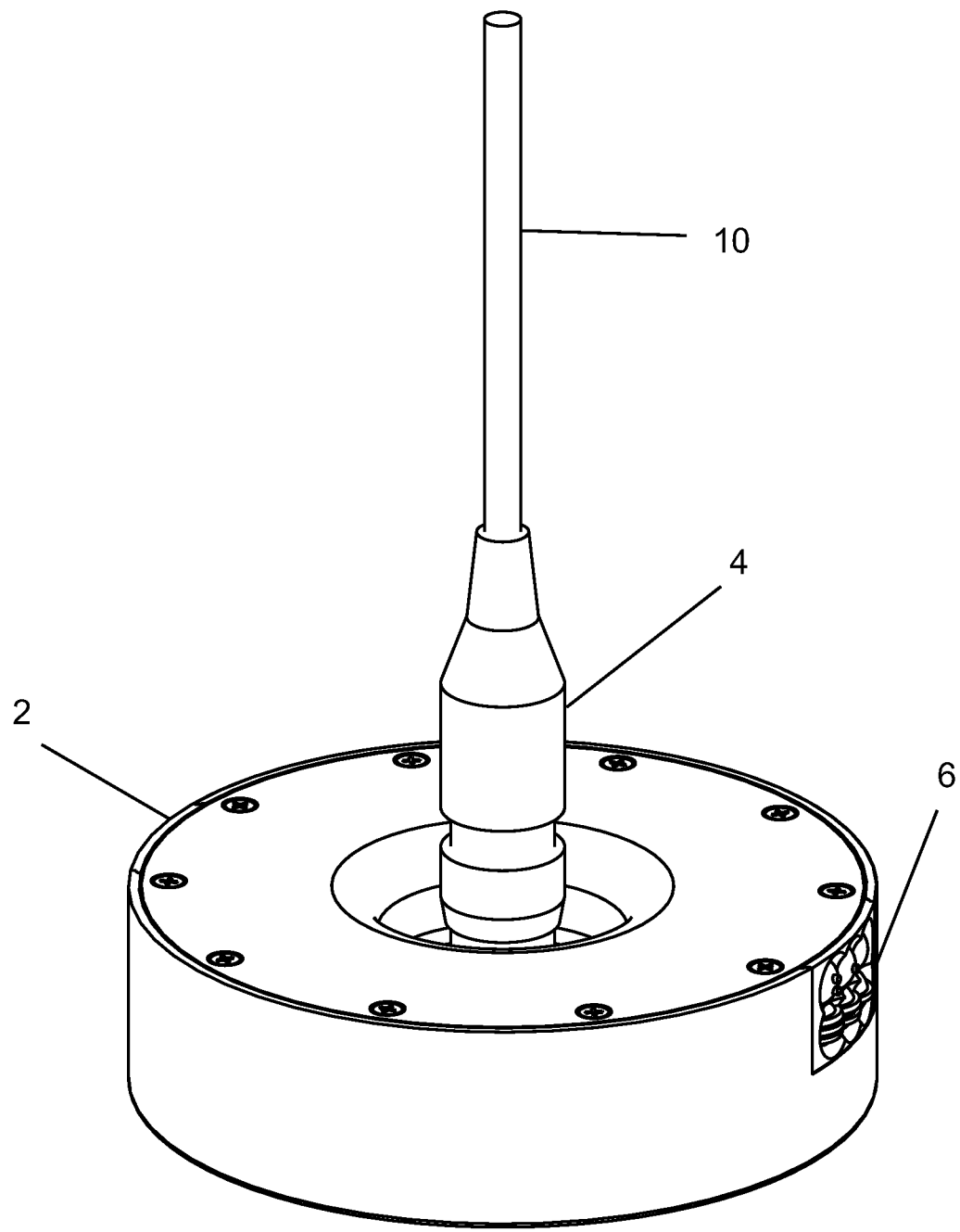
FIG. 2 is perspective top view, on an enlarged scale, of a component of the embodiment of FIG. 1.
Figure 3:
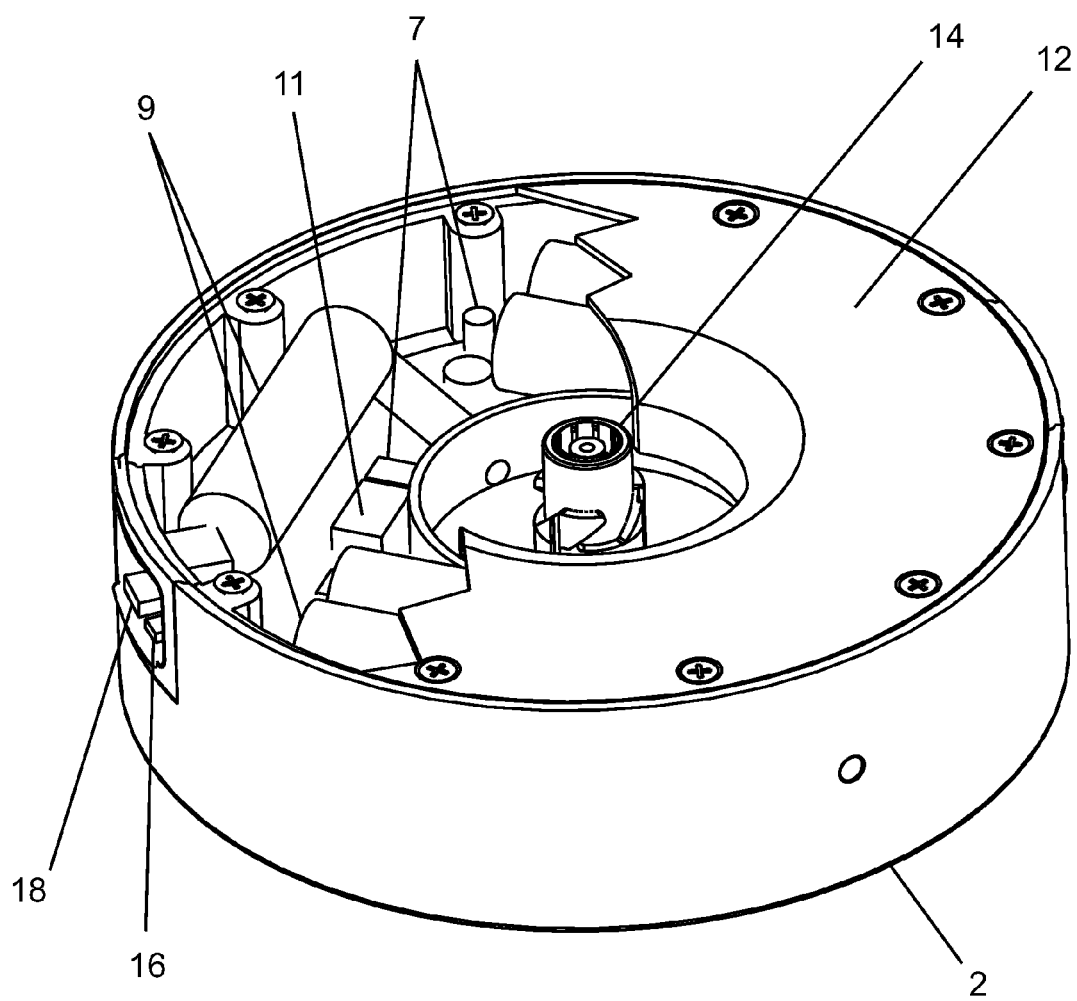
FIG. 3 is a view similar to that of FIG. 2, with portions removed and broken away, of the component of FIG. 2.
Figure 4:
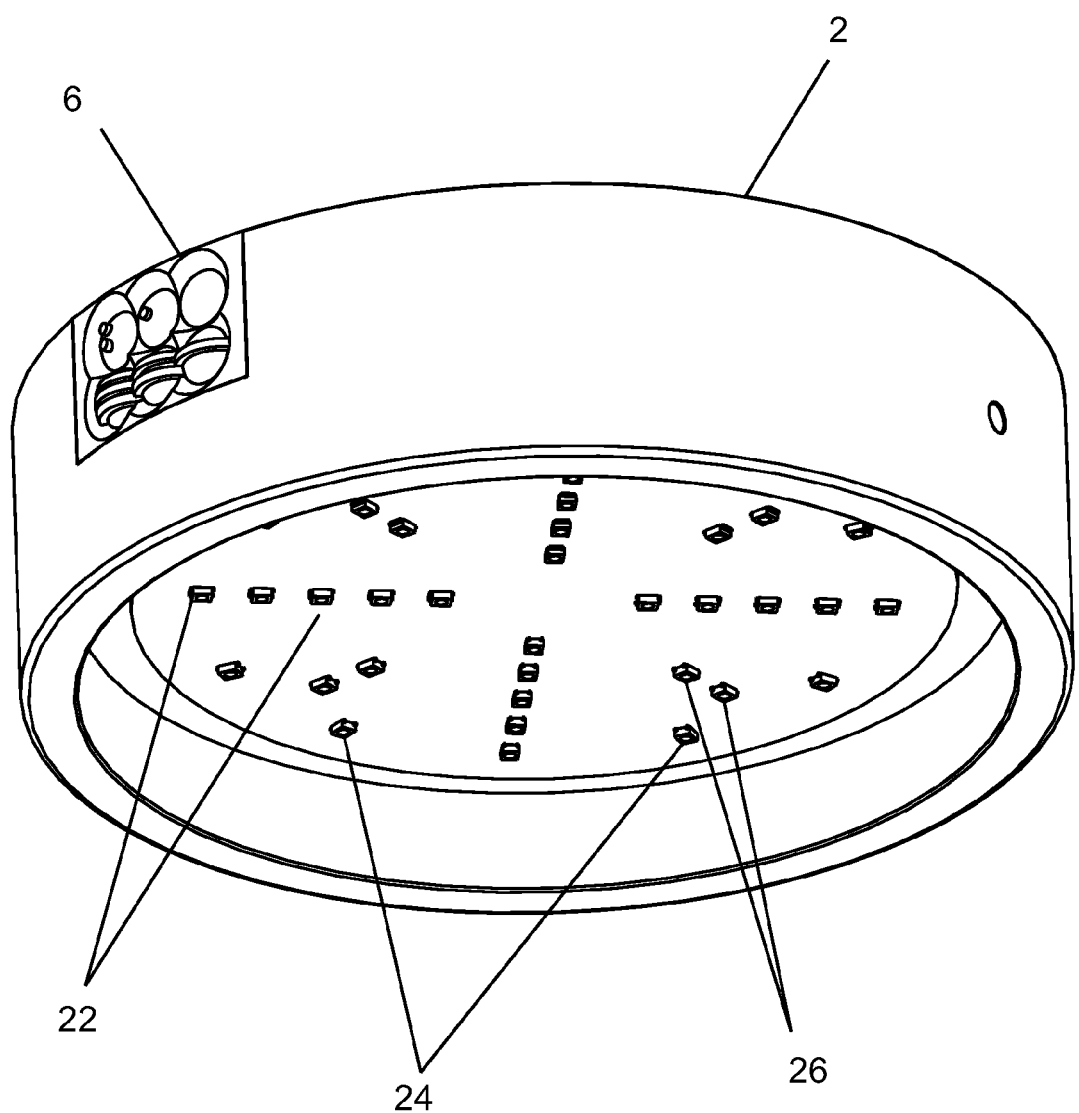
FIG. 4 is a perspective bottom view of the component of FIGS. 2 and 3.

As best shown in FIGS. 2-4, the lights 2 include a plurality of light emitting diodes (LEDs) 22, 24, 26 (FIG. 4) disposed in spaced relation within a housing. In particular embodiments, the LEDs are configured to selectively transmit light of two or more distinct colors within a field of illumination of the light. In the embodiment shown, LEDs 22, 24 and 26 transmit white, red, and green light, respectively. In other embodiments lights 2 may be provided with LEDs of only a single color, e.g., white LEDs. It is noted that incandescent bulbs used in conventional military lighting systems have a relatively short life span (e.g., 2-4 weeks) and as mentioned above, are relatively fragile and easily broken. In contrast the LEDs 22, 24, 26 have a projected lifespan of 10 to 20 years and are robust solid state devices which are relatively immune to damage from the shock and vibration typically associated with rough handling during transport, deployment, and operation in extreme environments, etc.

The lights 2 each include a power port in the form of a first quick-release connector portion 14 (FIG. 3). Connector portion 14 is configured for being coupled to the wiring harness 48 via a second quick-release connector portion 4 (FIG. 2). In particular implementations, connector portions 14 and 4 are those disclosed in U.S. Pat. No. 7,080,985, entitled Quick Release Connector Assembly, issued on Jul. 25, 2006, which is fully incorporated by reference herein. Using such connectors facilitates relatively quick setup and takedown of the system 1, while substantially reducing, if not eliminating, the possibility of cross-threading associated with prior art systems. As shown, connector portions 14, 4 may be used to secure a plurality of lights 2 in spaced relation along the length of the wiring harness 48.

Figure 5:
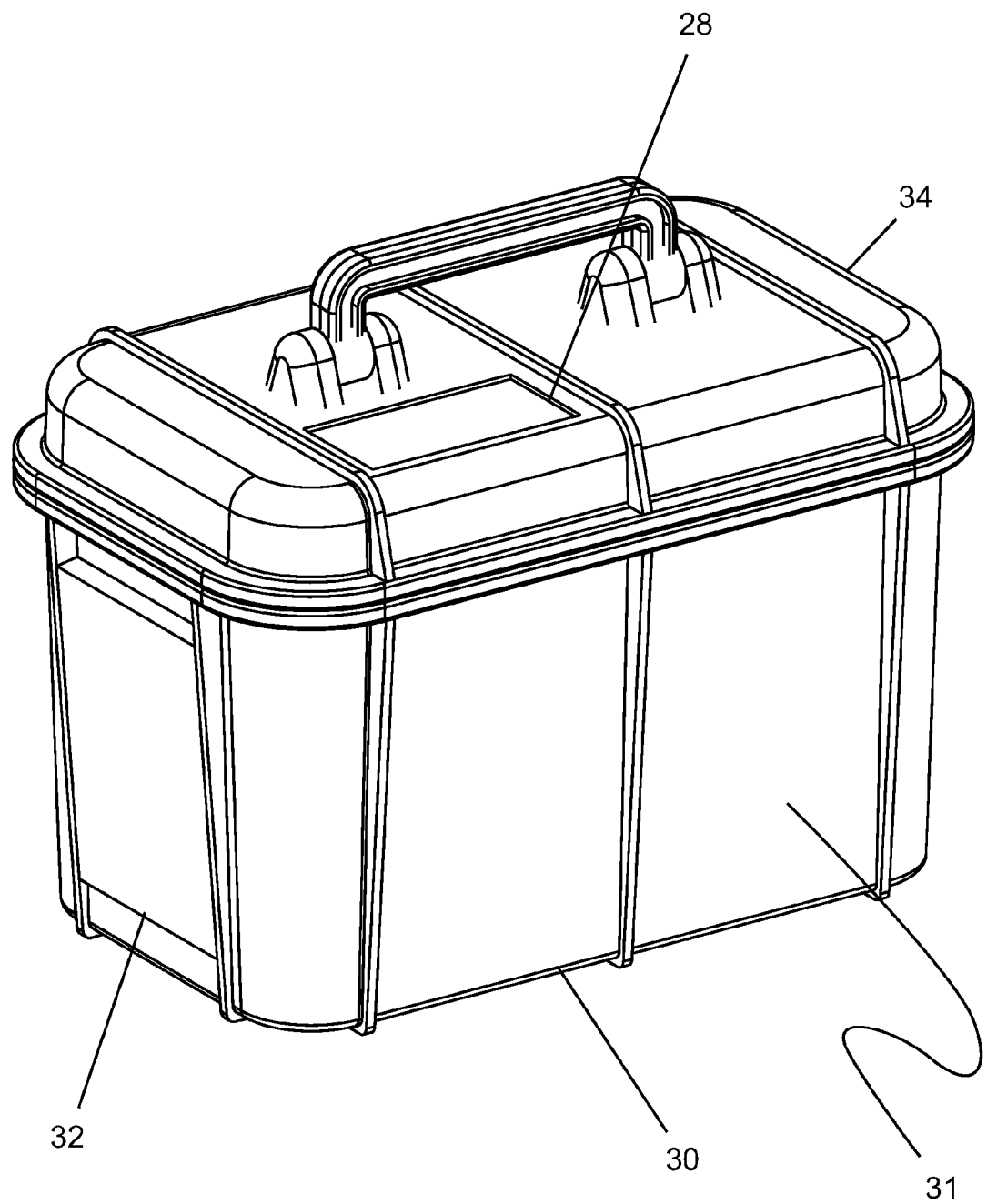
FIG. 5 is a perspective front view of another component of FIG. 1.
Figure 6:
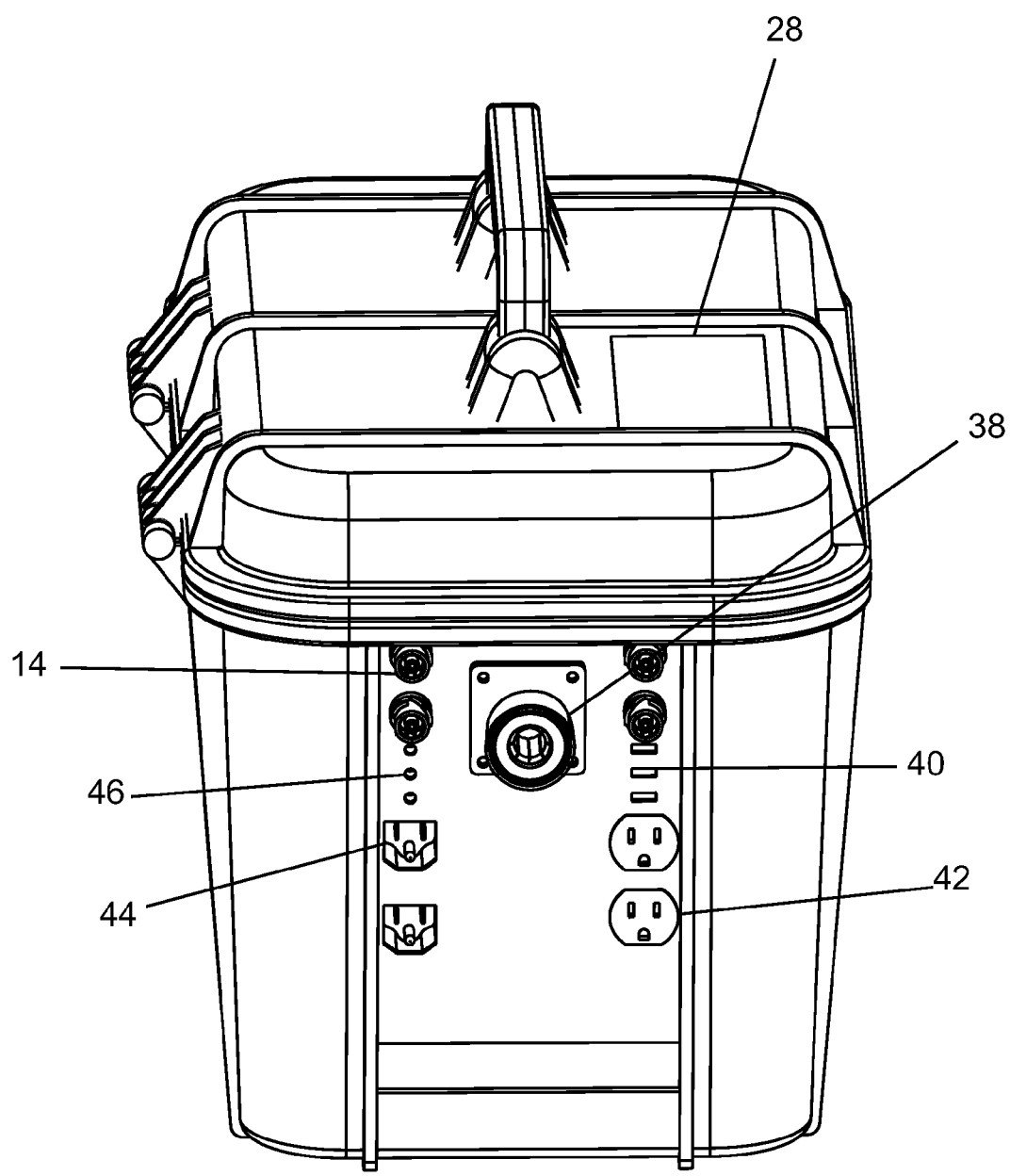
FIG. 6 is a perspective side view, with portions removed, of the component of FIG. 5.
Figure 7:
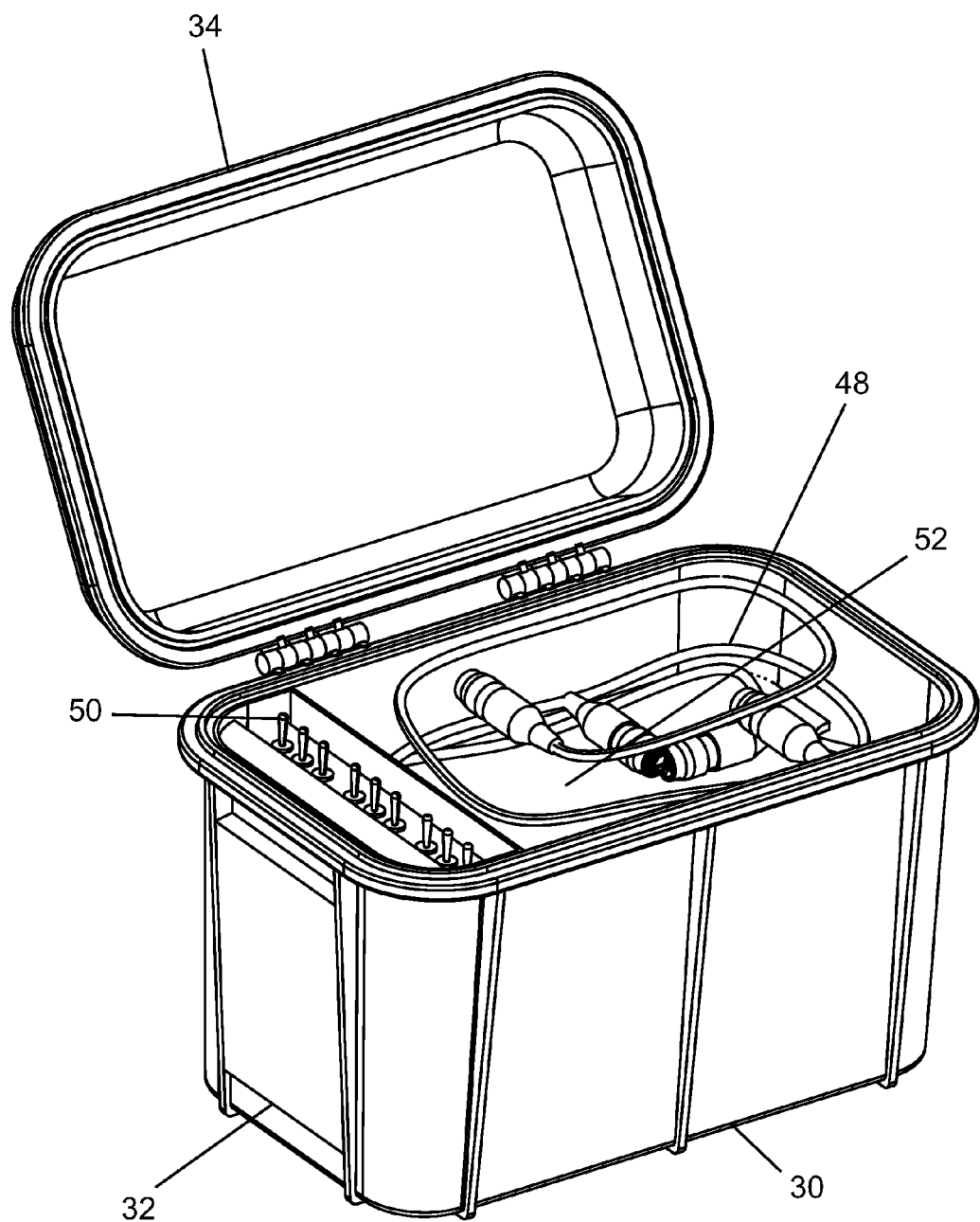
FIG. 7 is a perspective front view, with a cover opened, of the component of FIGS. 5 and 6.
Figure 8:
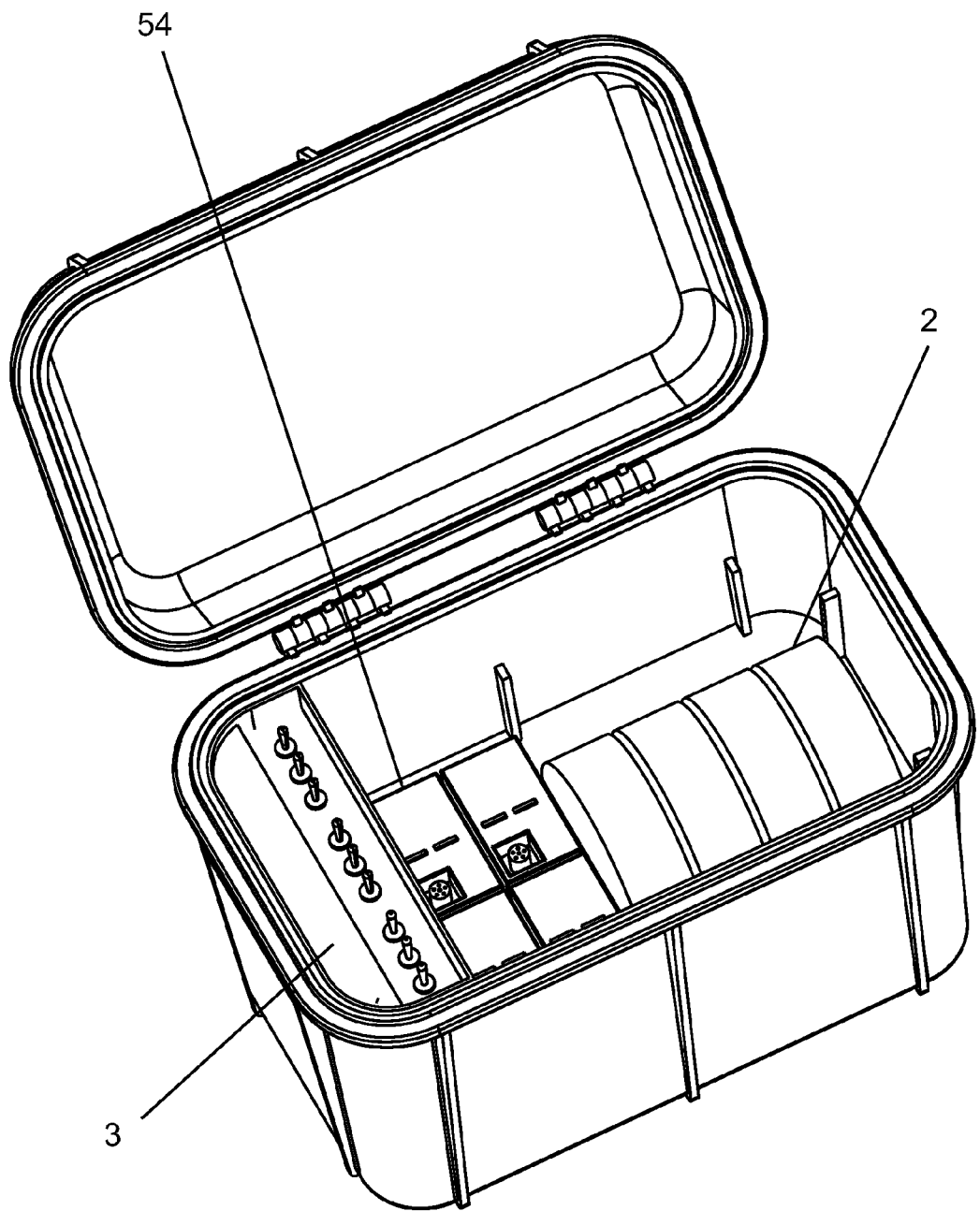
FIG. 8 is a view similar to that of FIG. 7, with elements removed for deployment.

Referring to FIGS. 5, 7 and 8, the controller 3 integrally disposed within case 31 is configured to selectively switch individual LEDs 22, 24, 26 on and off to control illumination within the field of illumination of the deployed lights. While in particular examples, both the controller 3 and power source 54 are integrally disposed therein, e.g., in base 30, the smart case 31 is also configured to have storage space in which the lights 2 and wiring harness 48 may be received for storage and transport to a desired deployment location. The case 31 may thus include all components needed for a complete tent setup, while typically weighing only about 65 pounds, or less than ½ that of an otherwise similar conventional military tent lighting system. As also shown, the base 30 is configured to be selectively opened and closed by cover 34. In addition, a port cover 32 may be used to selectively cover the various ports described in greater detail with respect to FIG. 6.

Figure 9:
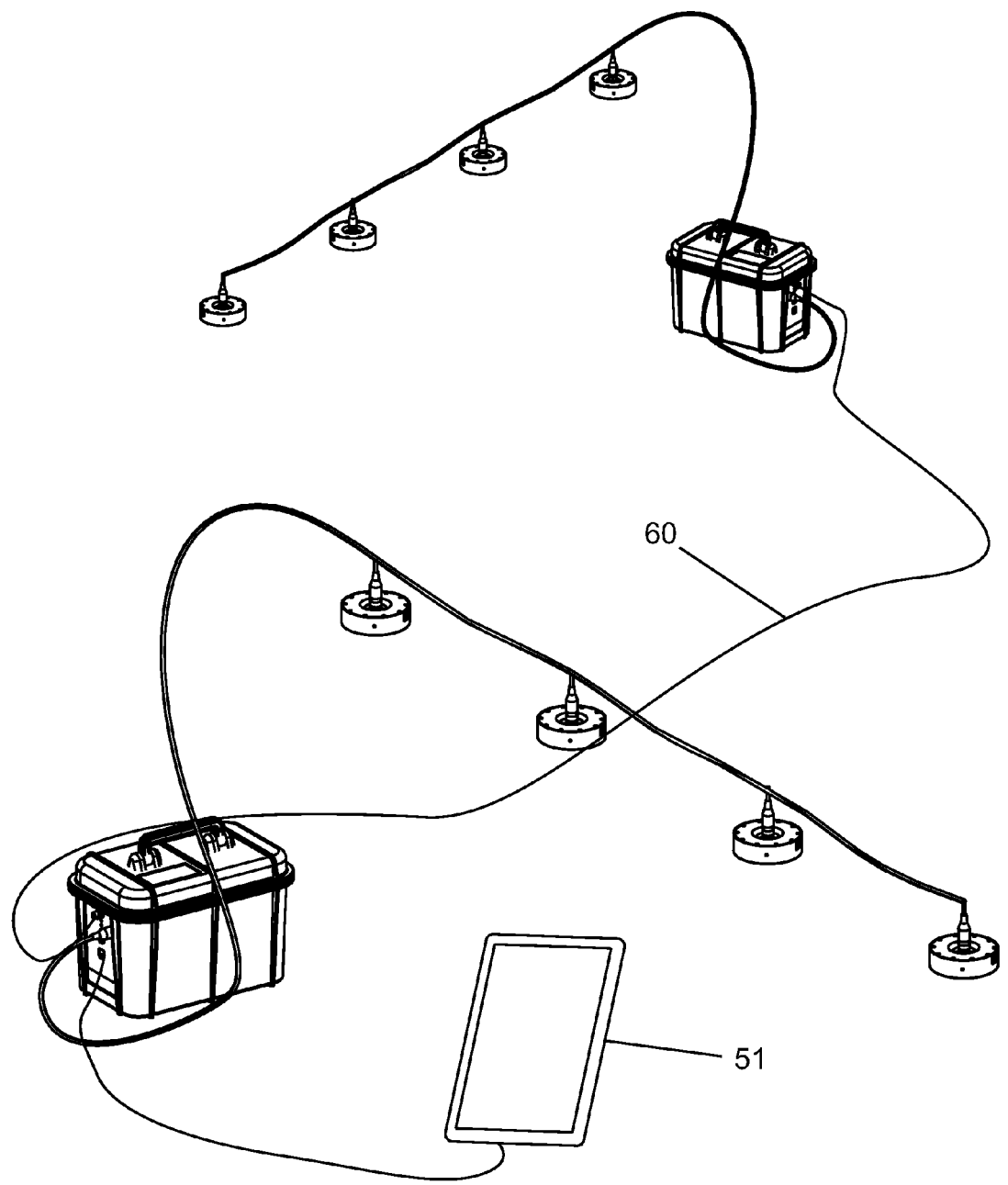
FIG. 9 is a view similar to that of FIG. 1, of an alternate embodiment of the present invention.

Once at the deployment location, the case 31 may be unpacked to extend the wiring harness 48 and connect the lights 2 as shown in FIG. 1. Once so deployed, the controller 3 may be used to switch on LEDs of one particular color while LEDs of other colors remain switched off. For example, the controller may actuate the white LEDs 22 during normal use, and then switch to the red LEDs 24 as desired to signify a "red alert" condition, or to the green LEDs, etc. Such color switching may be accomplished in any of several ways. For example, the controller 3 may send a signal via the wiring harness 48. Alternatively, the signal may be sent wirelessly, e.g., in the event the lights 2 are provided with their own communication modules equipped with wireless (e.g., WiFi) capabilities, as discussed in greater detail hereinbelow. The controller 3 may generate the light switching signal(s) in response to commands sent by an end-user device (e.g., computer) 51 (FIG. 9), as discussed below, or in response to commands entered via a user interface on the case 31 itself. Examples of such a user interface include a touch screen 28 (FIG. 5) or switches 50 (FIG. 7). Still further, each light 2 may be provided with its own user interface, e.g., in the form of power and color switches 6 (FIG. 4), by which a user may control each light 2 individually. These switches 6 may be particularly useful in embodiments in which the lights 2 are provided with their own local power sources (e.g., batteries) 9 (FIG. 3), to permit the lights to be used independently of the wiring harness 48. For example, although in particular embodiments it is desired to have the lights connected to the wiring harness 48 for the supply of power as well as for wired communication, from time to time it may be desired to disconnect lights from the network to use them independently, such as to serve as flashlights, or to lay on the ground to delineate aircraft landing sites, etc. The lights may be equipped with a charging port 16 (FIG. 3) for recharging the local rechargeable power source 9. In addition, a USB port 18 may be provided for either power input or output, e.g., for charging a user's computer 51.

In addition to switching the LEDs on and off for color selection, the controller 3 may be configured to selectively vary power consumption and level of illumination, e.g., to optimize battery life. In particular embodiments, this may be accomplished by varying the number of individual LEDs that are simultaneously illuminated. In addition, or alternatively, light output may be controlled by using a dimmer in the form of a conventional current limiter, voltage limiter, pulse width modulator, and/or combinations thereof, associated with the controller 3 or alternatively, disposed within the lights 2, to reduce the power supplied to the LEDs 22, 24, 26. In particular embodiments, the controller 3 may include multiple power settings, such as 1 watt, 2 watt, 4 watts, 14 watts and off. Having a range of settings permits battery life to be relatively precisely predetermined.

In this regard, an exemplary configuration may use XLAMP® (Cree, Inc.) MK-R LEDs 22, which provide about 200 lumens per watt. The case 31 may use four BRENTRONICS® (Bren-tronics, Inc.) rechargeable lithium-ion BT-70791A batteries 54, providing 6.8 amp hours in 24 volt operating mode. Such a system, using four lights 2 as shown in FIG. 1 within a GP medium tent 59 (FIG. 11) would provide a total of 800 lumens at the 1 watt setting, for approximately 163 hours before completely discharging the batteries 54. Operating the lights 2 for an average of 5 hours a day would permit the system to be operational for 32 days before a complete discharge. Similarly, using the 4 watt setting (to provide 3200 lumens) would allow the lights to be operational for 8 days at 5 hours on a day before discharge. It is expected that a higher wattage setting (e.g., 14 watts) would be generally reserved for medical tents in which maximum lighting is needed. At such a setting, the system 1 would be capable of producing 11,200 lumens for 11 hours.

Turning now to FIG. 3, as mentioned above, in particular embodiments lights 2 may be provided with a communication module 7 (disposed beneath cover 12) configured to communicate with controller 3 (FIG. 8). Communication module 7 may be configured for conventional packet-based communication, e.g., via Ethernet or wireless (WiFi) protocol. It should be recognized that substantially any wired or wireless communication protocols may be used. Moreover, although it is contemplated that operational communication with the lights 2 will be effected via controller 3, in some applications, it may be desired to communicate with individual lights 2 directly, e.g., from end-user device 51 (FIG. 9) as discussed below.

As another optional variation, the lights 2 may be provided with an electro-magnetic (EM) sensor 11 disposed within the housing and communicably coupled to the communication module 7. The EM sensor 11 may be any one of a number of sensor types, such as an IR (infra-red) or proximity sensor to detect the presence of personnel within the area of illumination of the light. EM sensor 11 may also include an identification sensor, such as in the form of an RFID detector or camera using facial recognition software to determine whether the detected personel are authorized to be in the area of illumination. For example, the presence of an IR signal without an associated RFID signal from a user's access card may be interpreted by the system 1 as an unauthorized access, to which the system may respond by generating an alarm signal. And although RFID and facial recognition technology may be desirable in some embodiments, it should be recognized that any number of sensor and communication technologies may be used without departing from the scope of the invention.

It should be further recognized that each light 2 may be configured to have its own unique communication (network) address, e.g., an IP address. Lights 2 having their own network addresses and EM Sensors may be configured to create an electronic sensor grid encompassing the entire collective illumination area of the lights 2. For ease of explanation, it will be assumed that the range of detection of a particular EM sensor 11 of a particular light 2 will be coextensive with the area of illumination of that light, although the skilled artisan will recognize that this may not necessarily be the case in particular applications. Personnel entering the grid may then be identified and/or monitored, as discussed above. In addition, each light 2 may be equipped with additional features, such as a speaker and/or microphone for direct communications, such as disclosed in U.S. Pat. No. 8,237,377 entitled Energy Efficient Lighting System and Method, issued on Aug. 7, 2012, the contents of which are fully incorporated by reference herein.

As mentioned hereinabove, in particular embodiments, the controller 3 may include a processor-equipped communication module 7 configured for being communicably coupled to an end user device 51 (FIGS. 9, 11) such as a tablet computer or smart phone, e.g., IPHONE® (Apple, Inc.). As also mentioned, the computer 51 may communicate with the controller 3 using any suitable wired (FIG. 9) or wireless (FIG. 11) protocol. The computer 51 may be provided with a graphical user interface, e.g., displayed in an app or browser, used to control the lights 2. The lights 2 may also be controlled via the user interface (e.g., touch screen 28 or switches 50) disposed on case 31 (FIG. 5). It should be noted that the lights 2 may be switched in substantially any manner desired. For example, all (or some) of the lights 2 in a particular network (e.g., tent deployment) may be switched from white to red, or white to green, etc., while also controlling light output levels. It should also be noted that multiple smart cases 31 may be communicably coupled to one another, by either wired communication link 60 (FIGS. 9, 10) or wireless (FIG. 11) communication links 58, to enlarge the size of the resulting network of lights 2. In this manner, any one of the networked smart cases 31 (either via its user interface or via computer) may be used to control all of the lights 2, such as to change the color and/or intensity of all of the lights at once.

As also mentioned above, controllers 3 and batteries 54 are configured for being disposed integrally with case 31. The controller 3 may thus be continuously powered by batteries 54 even when the case 31 is being used to store the lights 2 and/or wiring harness 48, as shown in FIG. 7. The controller 3 may thus be configured to communicate status information, such as the charge status of batteries 54, both during storage and transport as well as when the lights 2 are deployed. This status information may be communicated via display 28, computer 51, and/or by sounding a visual (e.g., flashing LEDs 22, etc.) or audible alarm when the battery charge drops below a predetermined level.

Figure 10:
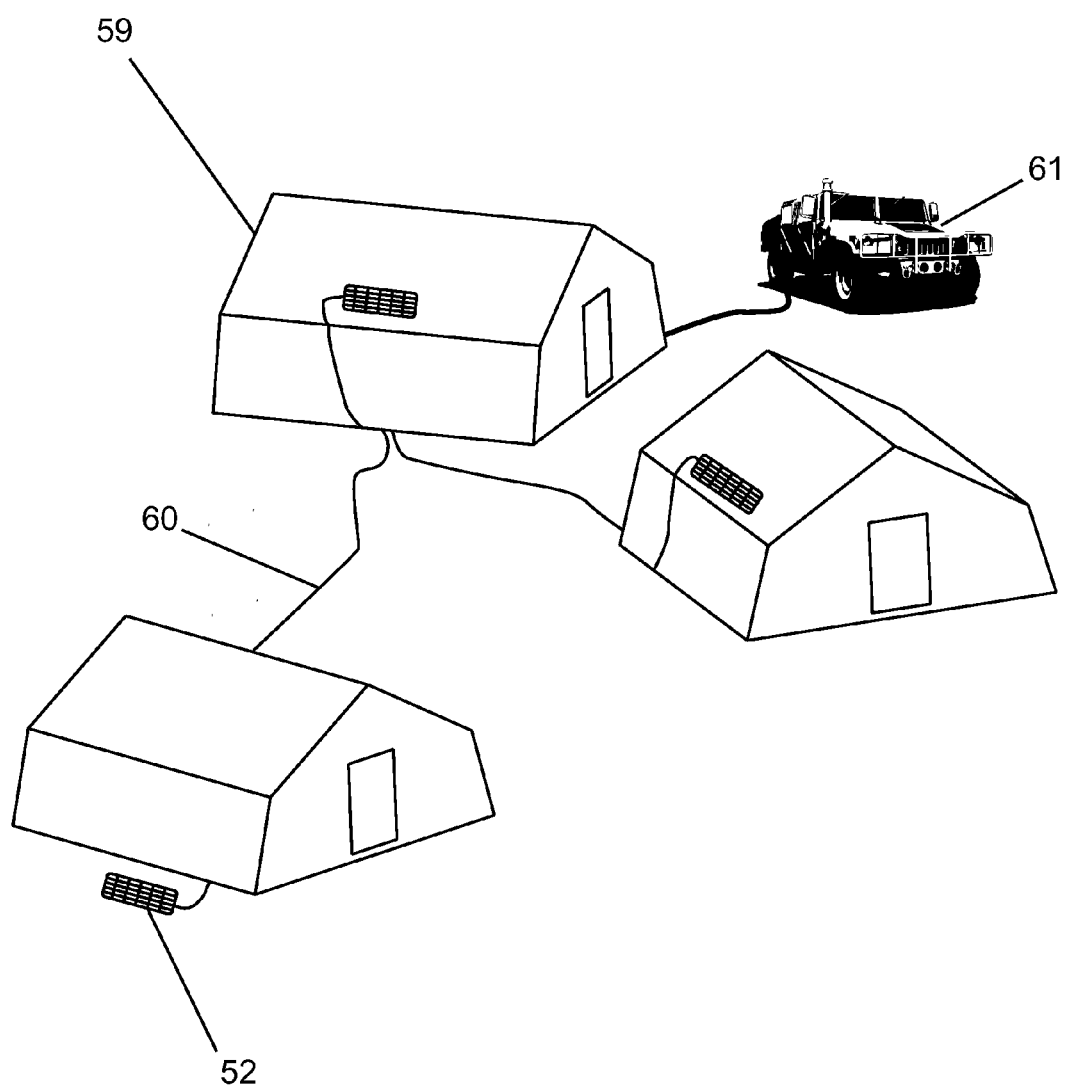
FIG. 10 is a perspective view of a representative deployment of an embodiment of the present invention, including optional aspects.
Figure 11:
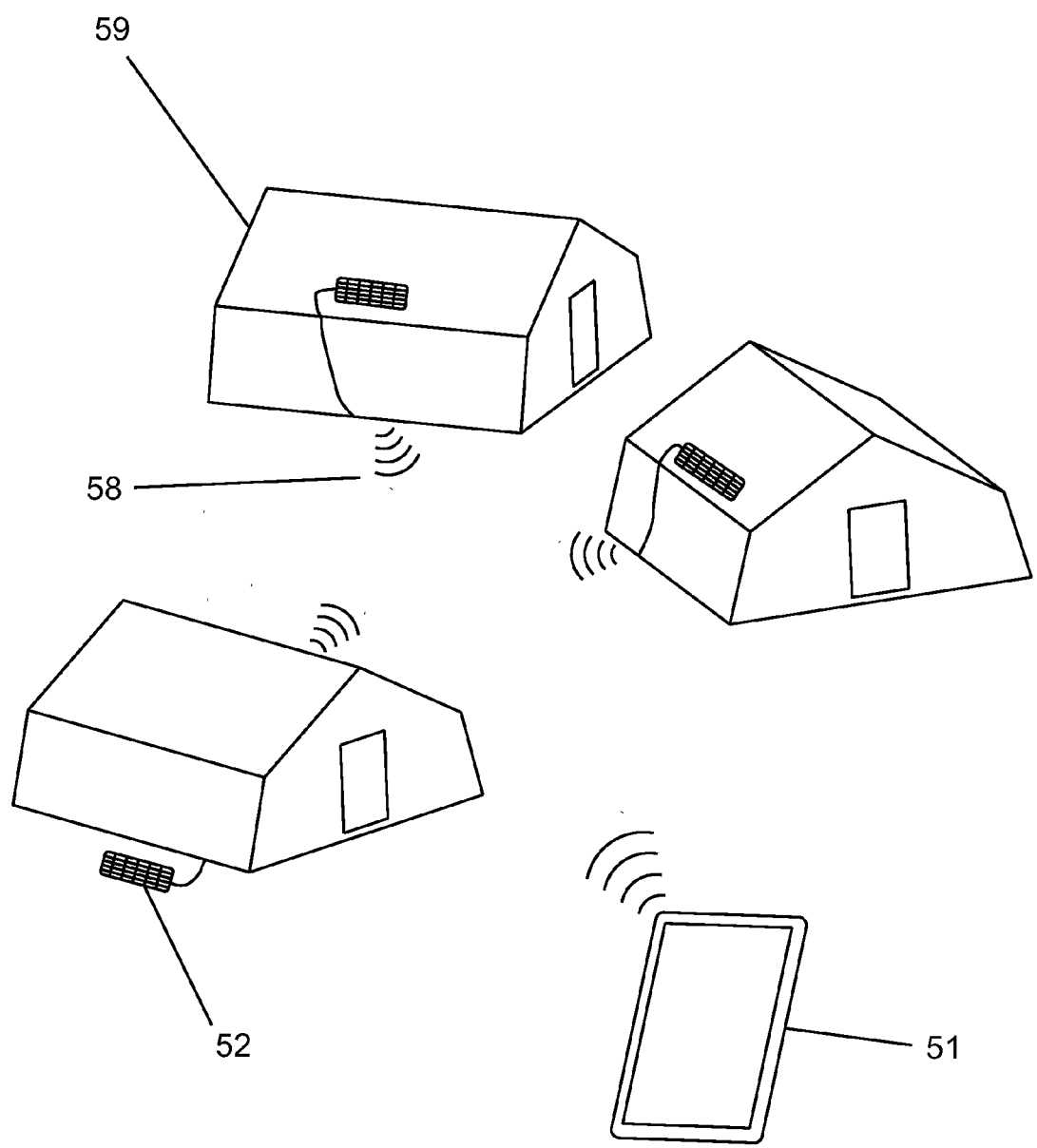
FIG. 11 is a perspective view of another representative deployment of an embodiment of the present invention, including other optional aspects.

Referring now to FIGS. 6, 10 and 11, the batteries 54 of smart cases 31 (and local batteries 9 of lights 2), may be recharged in a variety of ways. For example, during storage and/or transport, batteries 54 may be connected to an external power source, e.g., via a charging port in the form of plug 44 configured to receive conventional line voltage (e.g., 120 or 240 VAC), to maintain the batteries at optimal charge until needed. The charging port may take the form of a conventional Slave Plug 38 configured for being coupled to a slave cable of a military vehicle such as Humvee 61 (FIG. 10). Charging may also be provided via other connected cases 31, e.g., connected to one another via cable using connector portions 4, 14 of the type discussed hereinabove with respect to lights 2. It is noted that in particular embodiments, the power sources 9, 54, are low voltage devices, i.e., 12 or 24 volts DC. Conventional transformers/inverters may be disposed within case 31 to accept charging at the aforementioned line voltage, and/or to provide AC output, e.g., via a 120/240 VAC plug 42. Still further, conventional USB ports 40 may be provided for either power input or output, e.g., for charging a user's computer 51. As a further option, ports 46 may be provided for charging smart phones and the like.

Charging port(s) may also be provided to receive power from a solar panel 52 (FIG. 10, 11) that may be sized and shaped for storage and transport within case 31, and then deployed along with the lights 2 as shown. An exemplary solar panel 52 is a 330 square inch device capable of outputs as high as 68 watts per hour. When the lights are used on the 4 watt setting they will deplete typical batteries 54 at a rate of 16 watts per hour. If the lights are used for 5 hours a day, the panel 52 should recharge the batteries in less than two hours. Using the lights at the 14 watt setting, the panel 52 should be able to keep the batteries fully charged if the lights are on for the same length of time the sun is shining. A single Humvee 61 connected by a conventional slave cable to plug 38, should be able to recharge the batteries 54 of up to 88 cases 31 in 24 hours using just half of the output of a standard 200 amp 24 volt Humvee alternator.

Figure 12:
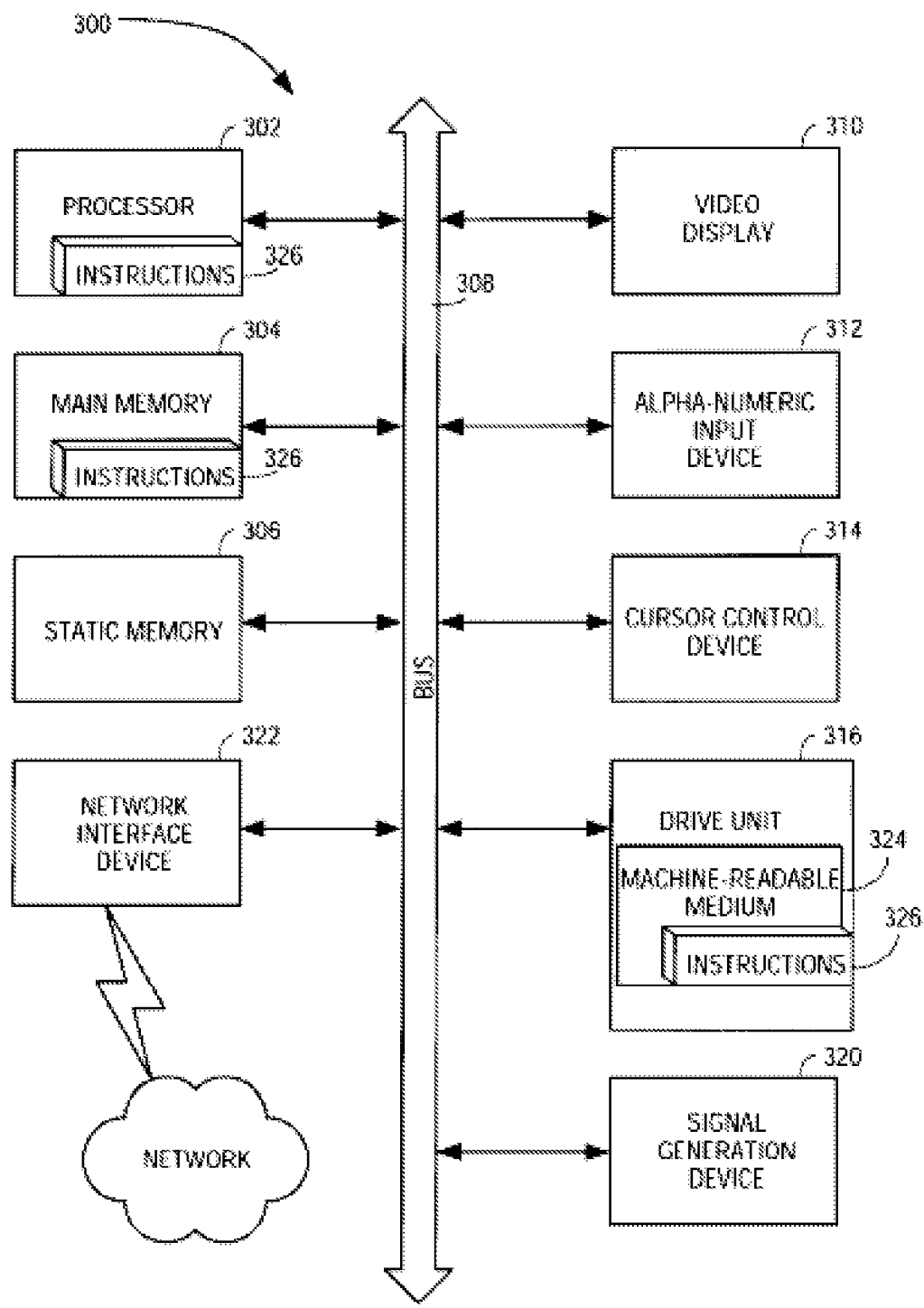
FIG. 12 is a block diagram of an exemplary computer system usable with embodiments of the present invention.

FIG. 12 shows a diagrammatic representation of a computer 51 in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322.

It should be noted that the lighting system shown and described herein is not limited to military applications. Rather, it may be used in any number of applications, such as for emergency, construction, and camping light applications.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Having thus described the invention, what is claimed is:

1. A rapidly deployable portable lighting system comprising:
    a low voltage rechargeable power source;
    a plurality of lights, each including:
        a housing;
        a plurality of LEDs disposed in spaced relation within the housing and configured to receive operational power from the low voltage rechargeable power source, the LEDs configured to selectively transmit light of at least two mutually distinct colors within a field of illumination;
        a communication module; and
        a power port including a first quick-release connector portion;
    a wiring harness having a first end portion configured for being communicably coupled to the power source, and a second end portion having a plurality of second quick-release connector portions disposed in spaced relation thereon, the second quick-release connector portions configured for quick-release engagement with the first quick-release connector portions to supply power from the power source to the lights;
    a controller configured to communicate with the lights via the communication modules and to control status of the lights by selectively switching individual ones of the LEDs on and off, independently of one another, to control illumination within the field of illumination, and by selectively varying power consumption and level of illumination to optimize charge status of the power source; and
    a smart case having the power source and controller integrally disposed therein, the smart case being further configured to receive the lights and wiring harness therein for storage and transport, and to selectively permit the lights and wiring harness to be removed from the case for deployment, wherein the first end portion is communicably coupled to the power source and the second end portion is extended to the lights disposed in spaced relation within a tent or other area to be illuminated;
    wherein the power source further includes local rechargeable power sources disposed within, and in communication with the LEDs and the communication modules of, each of the lights; and
    wherein the controller is configured to communicate information on said status during said storage and transport, as well as when the lights are deployed, said information including the charge status for the power sources.

2. The system of claim 1, wherein the controller is configured to enable LEDs of one of the distinct colors to be switched on while LEDs of another of the distinct colors are switched off.

3. The system of claim 2, wherein the distinct colors comprise mutually distinct color temperatures.

4. The system of claim 3, wherein the LEDs are selected from the group consisting of Red, Green, Blue, and White LEDs, and combinations thereof.

5. The system of claim 2, wherein the controller is configured to selectively vary power consumption and level of illumination by varying the number of LEDs that are simultaneously illuminated.

6. The light system of claim 2, wherein the controller further comprises a dimmer configured for operative engagement with the power source, the controller being configured to actuate the dimmer to adjust power supplied to the LEDs in response to control signals generated by the computer.

7. The system of claim 6, wherein the dimmer is configured to adjust at least one of the brightness and color of light output by the LEDs.

8. The system of claim 7, wherein the dimmer is selected from the group consisting of current limiters, voltage limiters, pulse width modulators, and combinations thereof.

9. The system of claim 2, wherein the communication module is configured for packet based communication wirelessly or via the wiring harness.

10. The system of claim 9, wherein the controller comprises a processor and is configured for being operated by a computer communicably coupled thereto.

11. The system of claim 10, comprising a plurality of said smart cases, wherein the controllers of each of the smart cases are configured to communicate with one another.

12. The system of claim 11, wherein the controllers of the smart cases are configured to communicate wirelessly with one another.

13. The system of claim 10, wherein the controller is configured to communicate with a computer during said storage and transport, as well as when the lights are deployed.

14. The system of claim 13, wherein the controller is configured to communicate charge status of the power source to the computer during said storage and transport.

15. The system of claim 9, wherein the lights further comprise an electro-magnetic (EM) sensor disposed within the housing and communicably coupled to the communication module.

16. The system of claim 15, wherein the EM sensor is configured to detect the presence of personnel within the area of illumination of the light.

17. The system of claim 16, wherein the EM sensor further comprises a verification sensor configured to determine whether the presence of personnel is authorized.

18. The system of claim 1, wherein the lights are configured to operate independently of the wiring harness, using power from the local rechargeable power source.

19. The system of claim 1, wherein the lights each include a charging port configured for recharging the local rechargeable power source.

20. The system of claim 1, further comprising a solar panel configured for operative power-supplying engagement with the rechargeable power source, the solar panel configured for being removably received within the smart case.

21. The system of claim 1, wherein the rechargeable power source is selected from the group consisting of a battery and capacitor.

22. The system of claim 1, wherein the smart case comprises a charging port configured for charging the rechargeable power source.

23. The system of claim 22, wherein the charging port comprises at least one of a slave plug configured for being coupled to a charging system of a motor vehicle, a quick-release connector, and a 120/240 VAC plug.

24. The system of claim 1, wherein the smart case has a plurality of output ports.

25. A method of deploying a portable light system comprising:
 (a) transporting the rapidly deployable portable lighting system of claim 1 to a desired deployment location;
 (b) removing the wiring harness from the case and communicably coupling a first end portion of the wiring harness to the rechargeable power source;
 (c) removing the lights from the case and coupling them to the wiring harness with the quick release connector portions;
 (d) disposing the lights in spaced relation within an area to be illuminated;
 (e) with the controller, selectively switching individual ones of the LEDs on and off, independently of one another, to control illumination within the field of illumination; and
 (f) recharging the rechargeable power source using at least one of a solar panel and motor vehicle alternator coupled to the case.

* * * * *